US007130932B1

United States Patent
Ghaffari

(10) Patent No.: US 7,130,932 B1
(45) Date of Patent: Oct. 31, 2006

(54) METHOD AND APPARATUS FOR INCREASING THE PERFORMANCE OF COMMUNICATIONS BETWEEN A HOST PROCESSOR AND A SATA OR ATA DEVICE

(75) Inventor: Bahareh Ghaffari, Boulder, CO (US)

(73) Assignee: Adaptec, Inc., Milpitas, CA (US)

( * ) Notice: Subject to any disclaimer, the term of this patent is extended or adjusted under 35 U.S.C. 154(b) by 522 days.

(21) Appl. No.: 10/191,958

(22) Filed: Jul. 8, 2002

(51) Int. Cl.
*G06F 13/00* (2006.01)

(52) U.S. Cl. .............................. 710/22; 710/5; 710/35; 710/52

(58) Field of Classification Search ................ 710/5–7, 710/20–28, 33–35, 52, 305–310; 711/111–112
See application file for complete search history.

(56) References Cited

U.S. PATENT DOCUMENTS

| | | | | |
|---|---|---|---|---|
| 4,716,522 A | * | 12/1987 | Funabashi et al. ............ | 710/56 |
| 5,497,476 A | * | 3/1996 | Oldfield et al. ............ | 711/112 |
| 5,625,800 A | | 4/1997 | Brayton et al. ............ | 395/500 |
| 5,655,147 A | | 8/1997 | Stuber et al. ............... | 395/827 |
| 5,784,390 A | | 7/1998 | Masiewicz et al. ...... | 371/40.11 |
| 5,812,877 A | | 9/1998 | Young ......................... | 395/844 |
| 5,838,950 A | | 11/1998 | Young et al. ............... | 395/500 |
| 5,923,896 A | | 7/1999 | Young ......................... | 395/825 |
| 6,006,292 A | | 12/1999 | Young ......................... | 710/39 |
| 6,012,107 A | | 1/2000 | Young ......................... | 710/39 |
| 6,021,462 A | * | 2/2000 | Minow et al. ............... | 711/114 |
| 6,088,742 A | | 7/2000 | Sim ............................. | 710/52 |
| 6,105,075 A | * | 8/2000 | Ghaffari ....................... | 710/5 |
| 6,105,080 A | * | 8/2000 | Holt et al. .................... | 710/26 |
| 6,157,964 A | | 12/2000 | Young ........................... | 710/5 |
| 6,173,342 B1 | | 1/2001 | Tsunoda et al. ............... | 710/8 |
| 6,192,492 B1 | | 2/2001 | Masiewicz et al. ........... | 714/56 |
| 6,199,122 B1 | | 3/2001 | Kobayashi .................... | 710/36 |
| 6,243,767 B1 | | 6/2001 | Young ........................... | 710/3 |
| 6,253,272 B1 | | 6/2001 | Young ........................ | 710/129 |
| 6,640,274 B1 | * | 10/2003 | Huffman et al. ............ | 710/260 |
| 6,697,885 B1 | * | 2/2004 | Goodfellow .................. | 710/22 |
| 6,715,004 B1 | * | 3/2004 | Grimsrud et al. ............. | 710/35 |
| 6,754,735 B1 | * | 6/2004 | Kale et al. .................... | 710/33 |
| 2004/0186931 A1 | * | 9/2004 | Maine ........................... | 710/22 |

* cited by examiner

*Primary Examiner*—Christopher Shin
(74) *Attorney, Agent, or Firm*—Sheridan Ross P.C.

(57) ABSTRACT

A method and apparatus for increasing the performance of communications between a host processor and an interconnected device is provided. The present invention allows data transfers to be performed without requiring frequent interrupts of the host processor by the adapter interconnecting the host processor to the device. In addition, the present invention allows the host to issue commands without writing extensive commands or data to the adapter. Instead, the host is merely required to increment a value held by a register, and to place commands in memory that is local to the host. Furthermore, the present invention allows direct memory access operations to commence even in the absence of receiving confirmation from the device that the device is ready to perform such operations. The present invention is suitable for interconnecting a host system to one or more devices, including in connection with the provisions of a redundant array of inexpensive disks.

18 Claims, 8 Drawing Sheets

METHOD AND APPARATUS FOR INCREASING THE PERFORMANCE OF COMMUNICATIONS BETWEEN A HOST PROCESSOR AND A SATA OR ATA DEVICE

FIELD OF THE INVENTION

The present invention relates to adapters for advanced technology attachment interfaces, including serial advanced technology attachment interfaces. In particular, the present invention relates to the efficient transfer of data between a host and a serial advanced technology attachment device.

BACKGROUND OF THE INVENTION

Data may be transferred between host computers and peripheral storage devices in accordance with various standards. In addition, various methods of structuring the transfer of commands and data may be utilized.

As an example, according to a programmed input/output (PIO) scheme, the host computer issues commands to the storage device through an adapter. The adapter interrupts the host each time that it is ready to transfer a sector (e.g., 512 bytes) or a multitude of sectors of data. The host controls the transfer of data between the storage device and the memory by issuing instructions. Accordingly, a programmed input/output (PIO) scheme requires significant host resources in order to coordinate and control the transfer of data.

With reference now to FIG. 1, a flow chart illustrating the operation of a prior art adapter in accordance with a programmed input/output (PIO) system or scheme is shown. According to such a system, the host computer writes command parameters to the appropriate task file registers (step 100). The host then writes the command itself to the task file's command register. The task file registers are typically maintained as part of a host to device adapter (step 104). At step 108, a determination is made as to whether the device, for example, a hard disk drive, is ready. If the device is not ready, the system idles at step 108. If the device is ready, the task file status register is updated with a drive ready signal (step 112). In the case of a read from the device, an interrupt is also asserted to the host. Depending on the direction of the transfer, the host or the device writes the data register, until one or more sectors of data are transferred (step 116). After the data has been transferred, the adapter interrupts the host (step 120) to notify the host that the transfer of data has been completed. At step 124, if all commanded data transfers have been completed, the system may return to step 100. If data transfers remain to be completed, the system returns to step 108.

From the above description of a prior art programmed input/output system for transferring data between a host computer and a peripheral storage device, it can be appreciated that such a system consumes a large amount of host computer resources. In particular, a PIO data transfer scheme requires the host computer to write the instructions to commence the operation to the adapter and requires the host computer to monitor the status register to determine when the data transfers can commence. Such implementations requiring interactions with the host are slow. Once the transfer of the data is started, the host or the device writes the data one dword at a time, resulting in a slow rate of transfer. Furthermore, the PIO scheme for transferring the data involves interrupting the host after one or multiple sectors of data have been transferred. In addition to consuming large amounts of host resources, the PIO scheme for transferring data is inefficient, because various components of the system sit idle while waiting for confirmation that other components are ready to perform the data transfers. Accordingly, clock cycles are wasted, and the time required to complete the data transfers is extended.

Another scheme for transferring the data is a direct memory access (DMA) system or scheme. In a direct memory access system, the storage device adapter is provided with the information regarding the location of the data to be transferred and the number of bytes to transfer to or from that location by the host computer. The storage device adapter can then directly access the memory to complete the data transfer. Under such a scheme, fewer host resources are required. However, in existing systems, the storage device controller issues interrupts periodically. In addition, in existing systems, there is a period of latency between receipt of a command to transfer data and actual data transfer.

With reference now to FIG. 2, a flow chart illustrating the operation of a prior art adapter in connection with a direct memory access system is illustrated. Initially, at step 200, the host computer writes the address of the data and the number of bytes for the transfer into the DMA engine registers. Next, at step 204, the host writes the command parameters and the command itself to task file registers in the adapter. At step 208, a determination is made as to whether the peripheral device, such as a hard disk drive, is ready to begin the data transfer. If the device is not ready, the system idles at step 208. If the device is ready, the DMA engine initiates the data transfer. The data is then transferred between the host computer and the peripheral device until the bytes in the DMA byte count register expire (step 216). At step 220, a determination is made as to whether all of the commanded data transfers have been completed. The commanded data transfer may be equal or larger than the bytes programmed in the DMA engine byte count register. If the commanded data transfer is not completed, the device channel interrupts the host at step 224 and transitions to step 228, for the DMA engine to be reprogrammed.

The adapter then returns to step 216 for the new data transfer. If at step 220 all the data transfers have been completed, the device channel interrupts the host (step 232). The data transfer is then complete (step 236).

From the above description of the operation of a prior art DMA scheme, it is apparent that the host computer is required to write commands to the registers associated with the adapter each time a transfer of data is required. Therefore, the host computer is required to expend clock cycles accessing the registers in the adapter to pass commands involving devices connected to the adapter. In addition, it will be noted that data transfers do not occur until confirmation that the device is ready. Accordingly, the components of the prior art system utilizing a DMA scheme are idle until such confirmation is received. The data transfer in a DMA scheme, although an improvement over the PIO scheme, has the additional limitation that the DMA engine byte count may not be sufficient to transfer all the data. If the number of bytes programmed in the DMA engine expire before the transfer of the data is completed, the host is interrupted to program the DMA engine with a new address and byte count. In this situation, the performance of the write operation to the device is limited by how fast the host can reprogram the DMA engine. In this situation, the performance of the read operation can be enhanced by adapters which store the data read from the device until the DMA engine is programmed. Typically the storage is limited and if the adapter's storage becomes full the device is held idle.

Therefore, there is a need for a method and apparatus that improves the exchange of command and status between the host and the adapter. Furthermore, there is need for a method and an apparatus that reduces the overhead in programming of the DMA engine by managing the address and byte count information (referred to as scatter/gather information) and that offloads the host from the flow control of the data exchanged between the host and the adapter. In addition, there is a need for a method and an apparatus that minimizes the number of interrupts that the host is required to service. In addition, there is a need for such a method and an apparatus to reduce the latencies associated between the host and the device.

SUMMARY OF THE INVENTION

In accordance with the present invention, a method and an apparatus for increasing the performance of communications between a host processor and an advanced technology attachment (ATA) device, including a serial ATA (SATA) device, are disclosed. In general, the present invention provides a system in which interrupts to the host processor are minimized, eliminated, or combined. In addition, the present invention removes the need for the host computer to write commands to the adapter, or to read status from the adapter. Furthermore, the present invention enhances the rate of the data transfer between the host and the SATA device by managing the data buffers internally and offloading the management of host from the scatter/gather data.

An adapter in accordance with the present invention generally comprises a host interface, one or several device channels, and an interrupt manager engine. In general, the interfaces may comprise physical interfaces between the adapter and busses or other communication links and the host system or device. The various instruction functions, data management and interrupt management may be implemented in firmware or microcode operating on a processor included as part of the adapter, external to the adapter, or on the host processor. In the discussions below the entity managing the adapter is referred to as the "host" as a general term.

Initially, the host sets up each device channel in the adapter by writing the address of the first instruction for that device in the adapter's device driver interface address register for that device. Then the host allocates memory for the status returned from the adapter and writes the address of that memory, referred to as done queue memory, into the adapter's done address register. When the host is notified that there needs to be a transfer to or from a device controlled by the adapter, the host builds the instructions, known as the input/output command block (IOCB), in its memory. The host then notifies the adapter by writing the producer register in the device driver interface block for the specific device channel with the number of outstanding commands (IOCB). The device channel within the adapter then downloads the IOCB. The IOCB contains the information necessary to activate various components of the device channel. The device channel within the adapter will then perform the commanded data transfers, and upon the completion of the operation increments the consumer register within the device driver interface of the specific device. The device channel also updates the done store in the interrupt manager with the status of the operation. The interrupt manager then writes the next location in done memory specified by the host, with the status just updated in its done store memory. The interrupt manager within the adapter notifies the host system that the data transfer has been completed either immediately or after several commands have been completed, by asserting an interrupt.

Accordingly, an adapter in accordance with the present invention is capable of transferring data at high speeds, and without requiring the host system to service interrupts during normal operation. Therefore, the data transfers are completed without requiring the host to write instructions or data to the adapter, and with a maximum of one interrupt per command to the host.

Additional advantages of the present invention will become readily apparent from the following discussion, particularly when taken together with the accompanying drawings.

DETAILED DESCRIPTION

Figure 1:
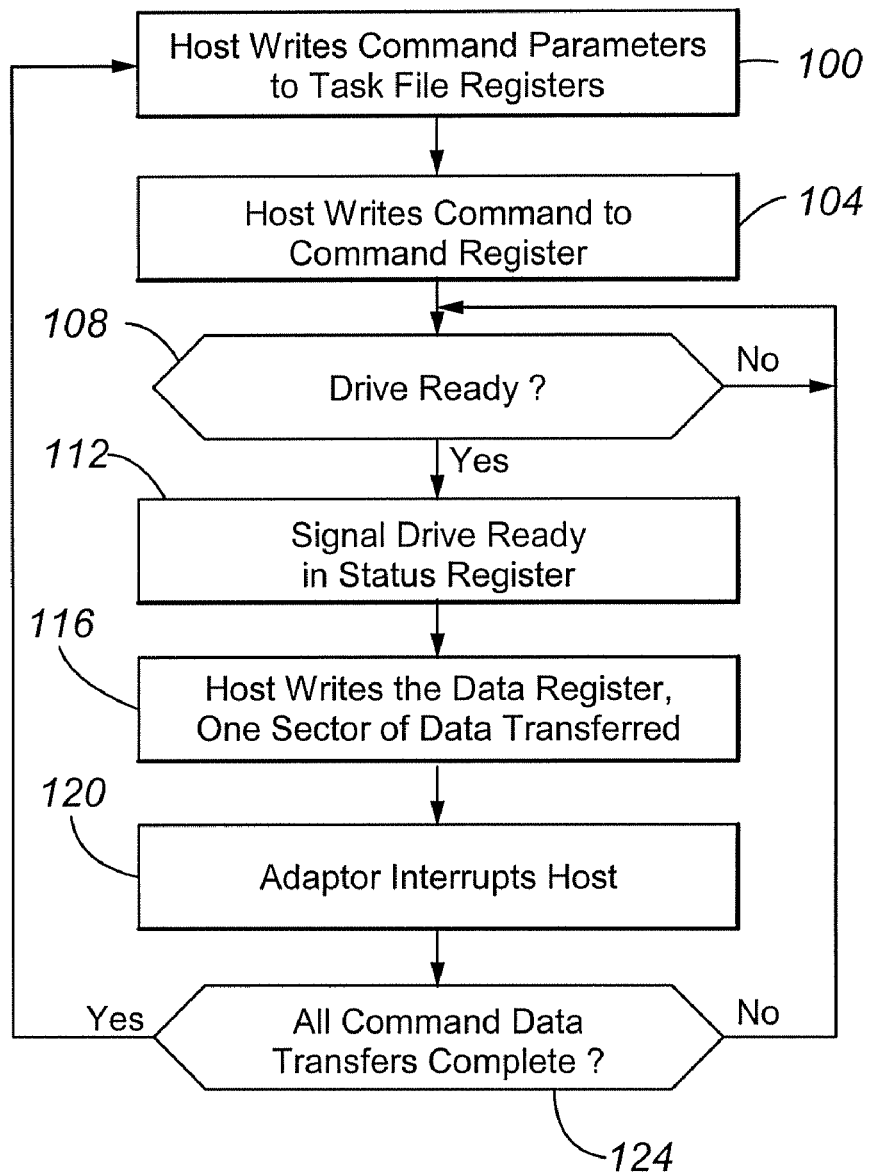
FIG. 1 is a flow chart illustrating the operation of a prior art adapter in accordance with a programmed input/output system.
Figure 2:
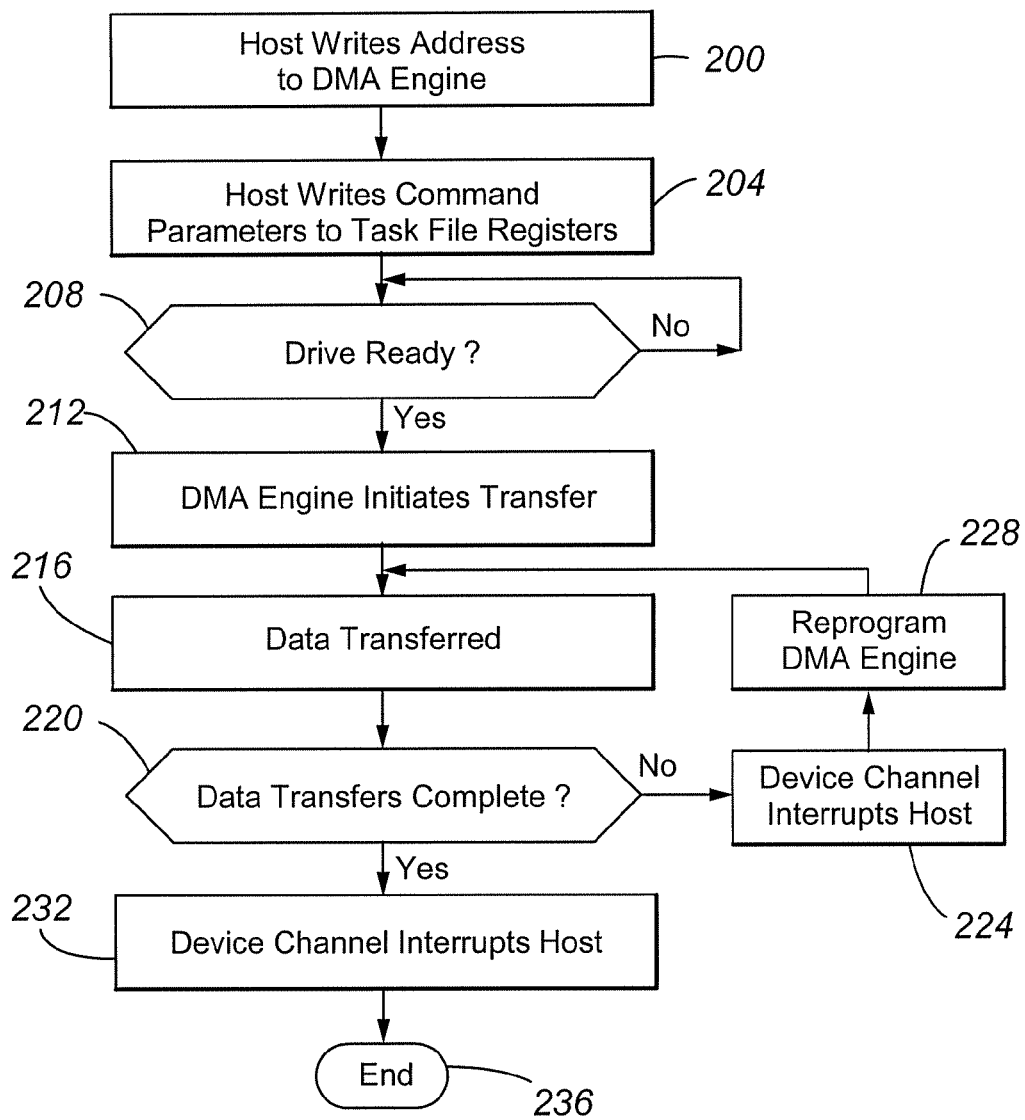
FIG. 2 is a flow chart illustrating the operation of a prior art adapter in connection with a direct memory access (DMA) system.
Figure 3:
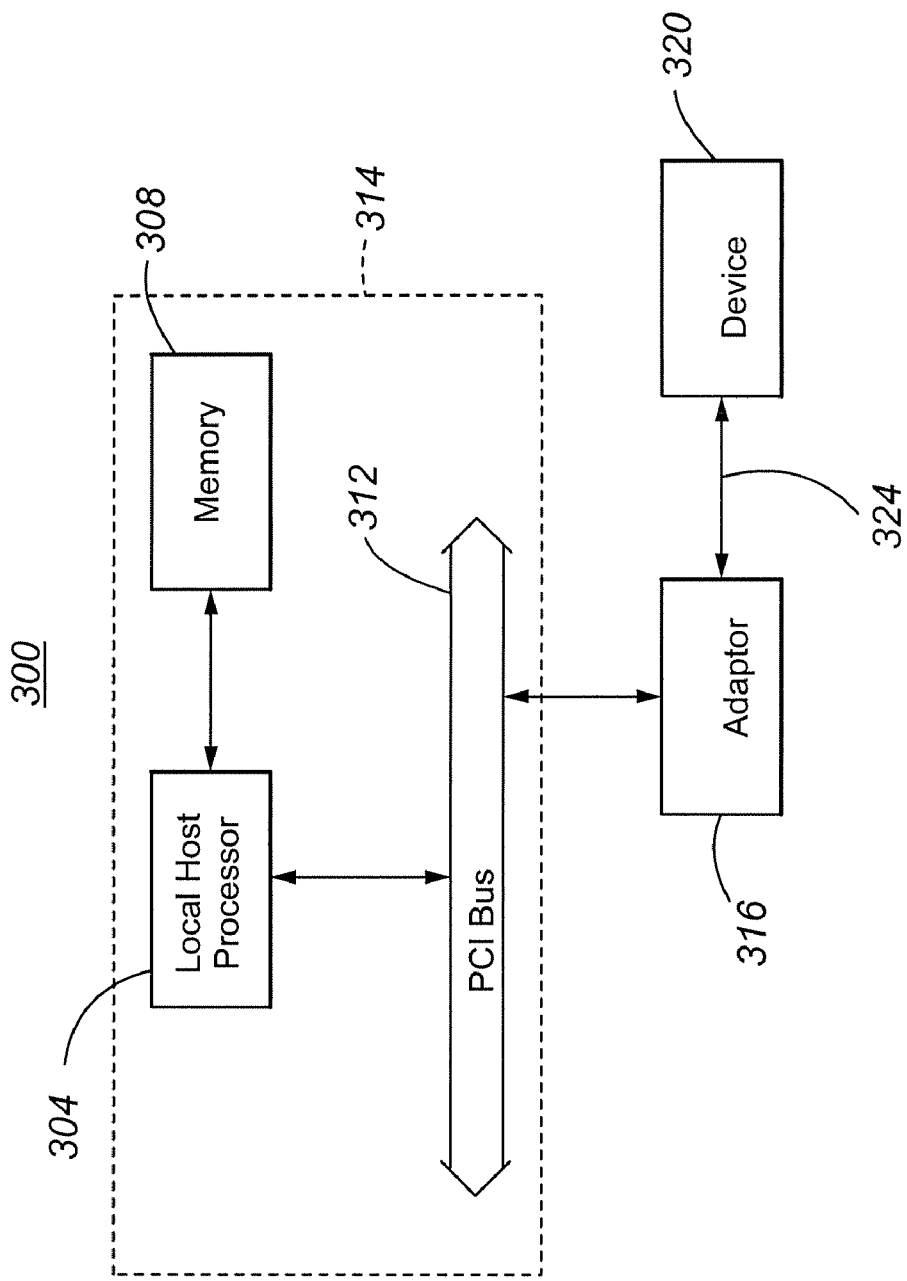
FIG. 3 is a block diagram of a computer system incorporating an adapter in accordance with an embodiment of the present invention.

With reference now to FIG. 3, a computer system incorporating an adapter in accordance with an embodiment of the present invention is illustrated in block diagram form. The computer system 300 generally includes a local host processor 304 and memory 308 local to the host processor 304. The local host processor 304 is interconnected to a system bus 312. The memory 308 may be interconnected to the bus 312 either through the local host processor 304, or through a direct connection. The local host processor 304, memory 308, and system bus 312 comprise a host system 314.

Also interconnected to the bus 312 is the adapter 316. The adapter 316 is in turn interconnected to an advanced technology attachment (ATA) or serial ATA (SATA) device 320 over a link 324. Accordingly, it can be appreciated that the adapter 316 serves to interconnect the device 320 to the host processor 304. Although only one storage device 320 is shown interconnected to the adapter 316, the adapter 316 may have multiple devices 320 interconnected thereto in a star topology configuration. It should be appreciated that the device 320 may include any type of device suitable for interconnection to an adapter 316 over an ATA or an SATA link 324, including, but not limited to, storage devices. For example, the device 320 may include a hard disk drive. Where the device 320 is a storage device, the adapter 316, in connection with a number of such devices 320, may implement a redundant array of inexpensive disks (RAID) storage system.

Figure 4:
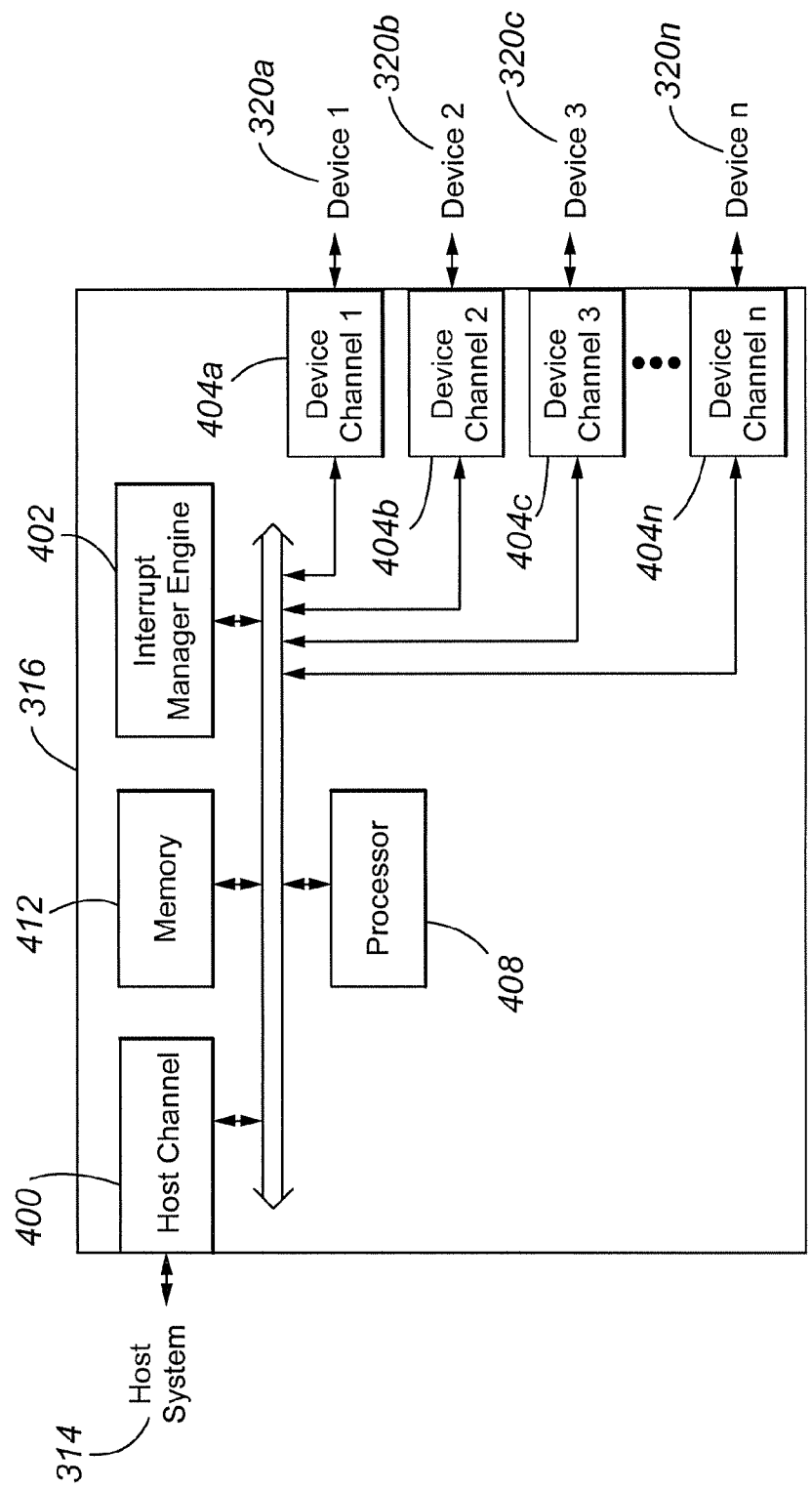
FIG. 4 is a block diagram depicting an adapter incorporating several components in accordance with an embodiment of the present invention.

With reference now to FIG. 4, the major physical components of an adapter 316 in accordance with the present invention are depicted in block diagram form. In general, the adapter 316 includes a host channel interface 400, an interrupt manager 402 and a plurality of device channels 404a–404n. Alternatively or in addition, host channel interface 400 of different types may be provided to allow a single adapter 316 to be selectively interconnected to different types of host systems 314 or host system busses 312. In general, the host channel 400 provides a physical interface between the adapter 316 and the host system 314. The device channels 404 serve to physically interconnect the adapter 316 to one or more devices 320. The device channel 404 updates an internal memory in interrupt manager 402, referred to as the done store, in the interrupt manager 402. The interrupt manager 402 then collects all the status from the device channels 404 and writes them to the host memory via the host channel interface 400. Upon completion of the write operation the adapter 316 asserts a single interrupt to the host 314 for the multitude of operations completed by the device channels 404. Of course, no more than one device channel 404 need be provided if no more than one device is to be interconnected to the adapter 316. Alternatively, a plurality of device channels 404 is desirable in connection with the provision of redundant storage systems and/or large capacity storage systems. For example, in connection with the provision of a redundant array of inexpensive disks (RAID) system, it is desirable to provide a number of device channels 404. For example, an embodiment of the present invention may provide seven device channels 404.

Although described in terms of discrete physical components in connection with FIG. 4, it should be appreciated that the adapter 316 can be implemented with varying levels of integration. For example, the functions of the blocks illustrated in FIG. 4 can be implemented on a single chip, as an integrated circuit. For instance, in accordance with an embodiment of the present invention, the adapter 316 comprises an integrated circuit having suitable interconnections to allow the adapter 316 to interconnect a host system 314 to a number of devices 320. As a further example, an embodiment of the present invention may provide an integrated circuit in combination with interconnections suitable to allow a host system 314 to be interconnected to as many seven devices 320.

In addition, to enhance the performance of the adapter 316 and to offload tasks from the host processor 304, a processor 408 and memory 412 can be provided as part of the adapter 316. If included, the processor 408 builds the IOCB and manages the status returned from the interrupt manager 402. In this scenario, the IOCB and the done status are kept in local memory 412. One with skill in the art can appreciate the performance gained by offloading the host processor 304 from such tasks and by reducing the time required to access the host for reading of the IOCB and updating of the SATA channel status.

Figure 5:
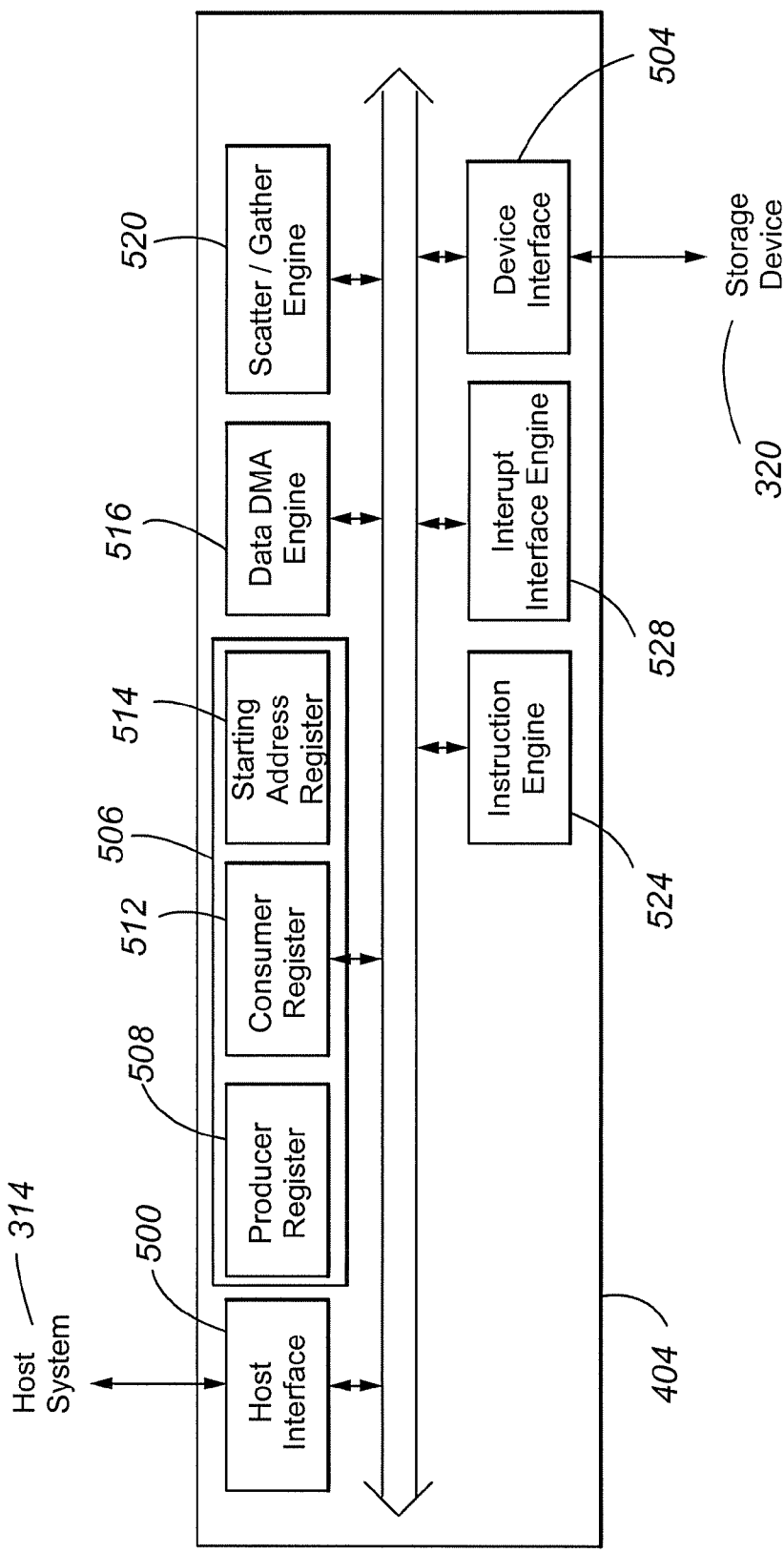
FIG. 5 is a functional block diagram depicting functional components of the device channel of an adapter in accordance with an embodiment of the present invention.

With reference now to FIG. 5, a functional block diagram depicting the functional components of the device channel 404 in accordance with an embodiment of the present invention is illustrated. The device channel 404 includes a host interface 500, interconnecting the device 320 to the host channel 400. An SATA (or ATA) device interface 504 is provided for interfacing the adapter 316 to the device 320.

The device channel 404 also provides a number of registers in a device driver interface 506. In particular, a producer register 508, a consumer register 512, and an instruction (IOCB) starting address register 514 are provided. In addition, the device channel 404 provides a number of processing engines, including the instruction manager engine 524, the scatter/gather engine 520, the data DMA engine 516 and the interrupt interface engine 528.

The instruction manager engine 524 is responsible for reading multiple IOCB's, and executing them one at a time. The address of the very first IOCB is preloaded into the instruction (IOCB) starting address register 514 prior to writing the producer register 508. This address is used the first time the contents of the producer 508 and consumer 512 registers differ. For all subsequent activity, the address of the next IOCB is taken from the current IOCB. IOCB's are linked lists of commands, with the address of the next IOCB contained in the current IOCB. This implies that when no more IOCB's are available in memory, the current IOCB must still contain a valid address in the next IOCB address field even though no IOCB is currently available at that location. In order to maximize efficiency, if there are IOCB's available (as indicated by the difference in the producer 508 and consumer 512 registers), more IOCB's are pre-fetched. The number of IOCB's pre-fetched is implementation specific and can be any number.

Once one or more IOCB's are built, the host 314 writes the producer register 508 of a device channel 404 with the context of its own copy of the producer queue for that channel. The instruction manager 524 detects a difference in the values of the producer 508 and consumer 512 registers for the channel, and reads the IOCB from the host's memory 308. As the operation continues, the host 314 continues to update the value of the producer register 508 to reflect additional IOCB's that have been built in the host's memory 308. Host software must track the number of IOCB's that have been processed and must guarantee that there are never more IOCB's outstanding that it can handle. To do this, it is expected that the host software maintain its own producer and consumer queues and updates the producer registers 508 in the device channels 404 when it updates its copy of the producer register. Host software updates its consumer register for that channel 404 as it reads the completion statuses from the done memory.

Up to four elements of the scatter/gather list are included in the IOCB. In accordance with an embodiment of the present invention, the format of the IOCB is the following:

---

Control
Transfer Byte Count
RP Address [31:0]
FIS dword 0
FIS dword 1
FIS dword 2
FIS dword 3
FIS dword 4
FIS dword 5
FIS dword 6
FIS dword 7
Next IOCB Address[31:0]
Next IOCB Address[63:32]
Scatter/Gather List Address Pointer[31:0]
Scatter/Gather List Address Pointer[63:32]
Reserved[31:4]    SG List    NEXT IOCB
                Address[65:64]    Address[65:64]
Scatter/Gather Element 0 Data Address[31:0]
Scatter/Gather Element 0 Data Address[63:32]
Scatter/Gather Element 0 Data Byte Count[31:0]
LE    LL    Address[65:64]    Reserved[27:0]
Scatter/Gather Element 1 Data Address[31:0]

-continued

```
      Scatter/Gather Element 1 Data Address[63:32]
      Scatter/Gather Element 1 Data Byte Count[31:0]
LE    LL       Address[65:64]       Reserved[27:0]
      Scatter/Gather Element 2 Data Address[31:0]
      Scatter/Gather Element 2 Data Address[63:32]
      Scatter/Gather Element 2 Data Byte Count[31:0]
LE    LL       Address[65:64]
      Scatter/Gather Element 3 Data Address[31:0]
      Scatter/Gather Element 3 Data Address[63:32]
      Scatter/Gather Element 3 Data Byte Count[31:0]
LE    LL       Address[65:64]
```

Control Word (Word 0) contains control operation. Control operations can be, but are not limited to, the following:
1. A control bit to abort the command;
2. A control bit to select the direction of the transfer;
3. Control bits for the tags associated with commands, if the commands are queued at the drive;
4. Control bits to indicate if the command is a packetized command.

Transfer Byte Count contains the sum of the bytes transferred via this IOCB. This number must be the sector count multiplied by the sector size, and must equal the total sum of the bytes in the byte count field of all the scatter/gather elements.

RP Address allows the host software to track the commands built as a child process of the main command FIS dword (0–7) is a Frame Instruction Structure as defined in the SATA 1.0 spec. The maximum number of dwords in the IOCB FIS is 8. The FIS is included in the IOCB.

Next IOCB Address [63:0] is a link to the next IOCB to be read. When the producer and the consumer are not equal, the content of this address is retrieved.

Scatter/Gather List Address pointer [65:0] is a link to the start of the scatter/gather list. This address should never be 0 for operations involving reading and writing of payload data to the device.

Scatter/Gather Elements (0–3) defined below. The IOCB contains a copy of the first four scatter/gather elements of the first scatter/gather sub-list. If the first scatter/gather sub-list contains less than four elements, the IOCB contains the entire sub-list including the link address.

A scatter/gather engine 520 is used to manage the scatter/gather list in hardware. The instruction engine activates the scatter/gather engine 520. Once activated, the scatter/gather engine 520 reads the scatter/gather elements from memory 308 and stores them in a local register in the data DMA engine 516. The scatter/gather engine skips 520 the null elements (elements with 0 in the byte count filed), and pre-fetches more elements as the last element pre-fetched is loaded in the DMA engine. Host software builds the scatter/gather list in its memory 308 as a means for handling DMA operation. The scatter/gather list is composed of several scatter/gather sub-lists that are chained together. Each sub-list is composed of scatter/gather elements.

Scatter/gather elements are composed of an address (ADRS) field, a byte count (BC) field, last list (LL), and last element (LE) fields.

The address (ADRS) field is 66 bits wide. The byte count field is a 32 bit field, where a byte count of zero skips the current element and the maximum number of bytes is 'hFFFF_FFFF. The last list (LL) field is a one-bit field that indicates whether the current list is the last linked sub-list. The last element (LE) field is a one-bit field that indicates if the current scatter/gather element is the last element of the current chain.

A scatter/gather element has the following format in memory.

```
              ADRS[31:0]
              ADRS[63:32]
              BC[31:0]
LE    LL      ADRS[65:64]      Reserved
```

A scatter/gather sub-list is composed of one or more scatter/gather elements as described above and a next link address (LINK_ADRS) field. The link address (LINK_ADRS) field is the address of the next sub-list. The LINK_ADRS field is 66 bits wide.

A scatter/gather sub-list has the following format in memory.

```
              ADRS[31:0]
              ADRS[63:32]
              BC[31:0]
LE    LL      ADRS[65:64]      Reserved
              ADRS[31:0]
              ADRS[63:32]
              BC[31:0]
LE    LL      ADRS[65:64]      Reserved
              . . .
              ADRS[31:0]
              ADRS[63:32]
              BC[31:0]
LE    LL      ADRS[65:64]      Reserved
              LINK_ADRS[31:0]
              LINK_ADRS[63:32]
```

The scatter/gather engine 520 activates the data DMA engine 516 by writing the address and byte count from the scatter/gather elements into the data DMA engine 516 internal registers. Once activated, the data DMA engine 516 manages the data from the source to the destination and requests the appropriate interfaces for reading and writing of the data. For example, in case of writing the data to the device 320, the data DMA engine requests the host channel interface 500 to read the data and stores the data in its local registers. The data may be sourced from the memory 308 and once it is received at the device channel 404 it is stored in a FIFO within the data DMA engine 516. The data DMA engine 516 may go through a multitude of scatter/gather elements before it has enough data to request the device interface 504. Once the data DMA engine determines that there is enough data in its FIFO, it requests the device interface 504 and the protocol (e.g., the SATA protocol) is initiated at the device interface 504. All the data is transferred using DMA to or from the host 314, regardless of the type of the SATA command in the FIS. The DMA logic in the device channel 404 uses the transfer byte count field to know the number of sectors to expect to or from the device 320. A host data overrun or underrun is signaled if the sector count does not match the sum of the byte count of the scatter/gather elements. In this case the status updated in the done store 612 reflects the error. The read operation is very similar to the write operation, the data DMA engine 516 requests the device interface 504. Once it determines that there are enough data in its FIFO, it requests the host interface 500 to transfer the data to the host 314.

At the completion of the command, the data DMA engine 516 activates the interrupt interface 528 within the device channel 404 to write the status of the operation in the done store logic within the interrupt manager 402, and the consumer register 512 for the channel 404 is incremented. If another command is queued in the Instruction engine, the device channel 404 immediately executes that command.

Figure 6:
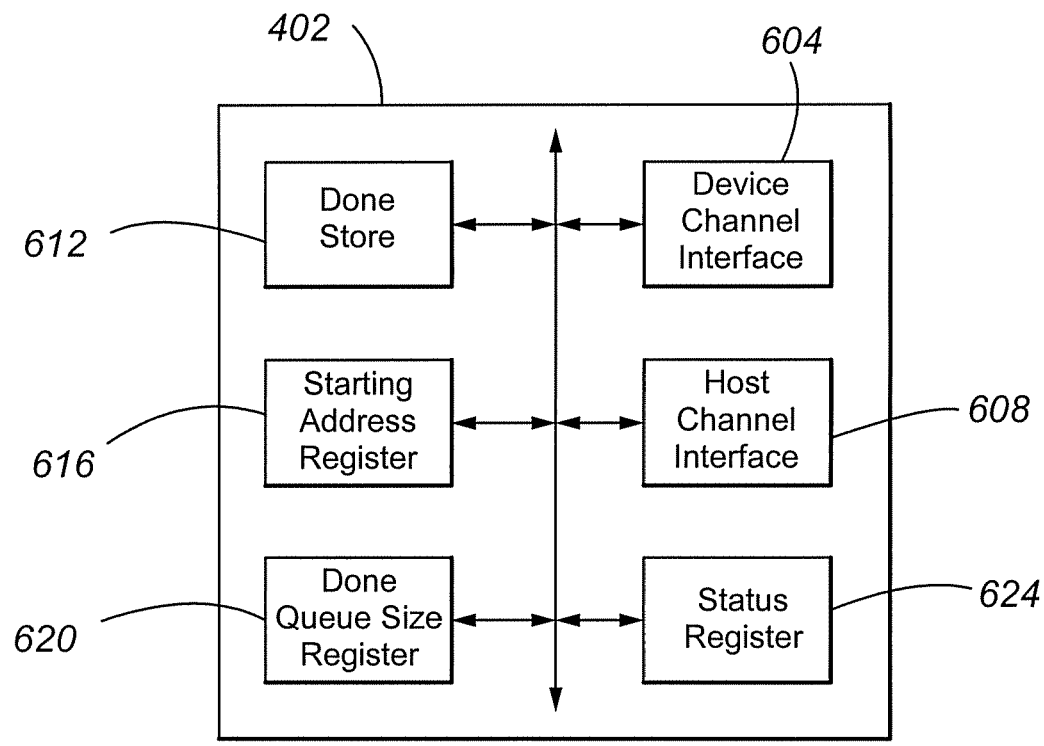
FIG. 6 is a functional block diagram depicting functional components of an interrupt manager of an adapter in accordance with an embodiment of the present invention.

The interrupt manager 402 is responsible for writing the completion status of all the channels to the host memory and interrupting the host upon completion of the transfer. As illustrated in FIG. 6, the interrupt manger 402 includes a device channel interface 604, through which the interrupt manager 402 communicates with the device channels 404, and a host channel interface 608, through which the interrupt manager 402 communicates with the host channel 400. A done store 612, where the interrupt manager 402 stores the status coming from the device channels 404, is also provided. The interrupt manager 402 contains several registers in order to communicate with host's memory. A done queue starting address register 616 contains the starting address of the done store 612 in host's memory. A done queue size register 620 denotes the size of the done queue memory in host's memory 308. The interrupt manager 402 automatically wraps once the done queue size is reached. Once the interrupt manager 402 detects that there is a status in its done store 612, it requests its host channel interface 608 to write the status or a multitude of statuses to the host memory 308.

Figure 7:
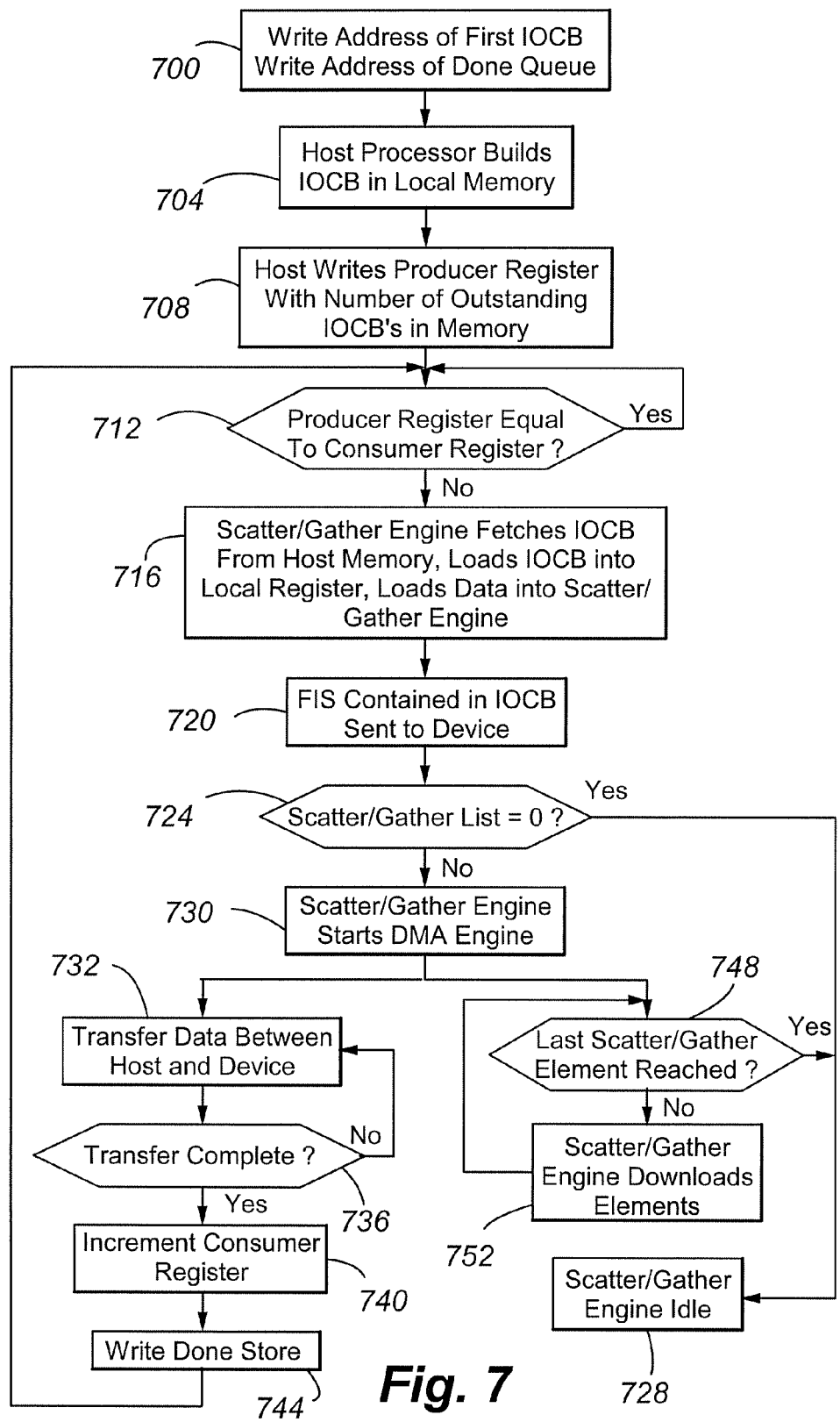
FIG. 7 is a flow chart illustrating the operation of an adapter in accordance with an embodiment of the present invention.

With reference now to FIG. 7, a flow chart illustrating the operation of an adapter 316 in accordance with an embodiment of the present invention is shown in the context of an example involving a data transfer. Initially, system initialization software writes the address of the first IOCB in the instruction (IOCB) starting address register 514 in the device channel 404 and the address of the done queue in the done queue starting address register 616 in the interrupt manger engine 402 (step 700). Once the host software determines that there is an activity involving the storage device, at step 704, the host processor 304 or processor 408, if provided, builds an input/output command block (IOCB) in its local memory. At step 708, the host writes the producer register 508 established in the controller's memory 308 with the number of outstanding IOCB's in memory 308 or 412 (if provided). Accordingly, it can be appreciated that the host processor 304, or processor 408, if provided, is not required to pass commands to the adapter 316 directly. Instead, the host processor 304, or processor 408, if provided, merely needs to place commands in memory 308 or 412 that is local to the host processor 304, or processor 408, and to write a single register 508 in the controller 316.

At step 712, the adapter 316 determines whether the value held by the producer register 508 is equal to the value held by the consumer register 512. If the values are equal, the adapter idles at step 712. If the producer register holds a value different than the consumer register, the instruction engine 524 fetches the IOCB either from the address indicated in the instruction (IOCB) starting address register for the first IOCB or the next IOCB address field in the IOCB. The instruction manager 524 loads the IOCB into its local registers. The instruction manager 524 then initiates the activity of the scatter/gather manager 520. The scatter/gather engine or manager 520 loads the scatter/gather data into the scatter/gather engine 520 (step 716). At step 720, the Frame Information Structure (FIS) contained in the IOCB is sent to the device 320, to allow the device 320 to prepare for the commanded operation. At step 724, a determination is made as to whether the scatter/gather list has expired. If yes, the scatter/gather engine 520 remains idle (step 728). If the scatter/gather list has not expired and the byte count of its current element is different than 0, the scatter/gather engine 520 starts the data DMA engine 516 (step 730). As can be appreciated by the instant description, the data DMA engine 516 is initiated without waiting for confirmation or a signal that the device 320 is ready for the commanded data transfer. Accordingly, the present invention removes latencies encountered by prior art controllers in the transfer of data. Specifically, the adapter 316 of the present invention eliminates delays in waiting for the device 320 to acknowledge readiness, by assuming that the device 320 will be ready for the commanded data transfer by the time the data DMA engine 516 is initialized. More specifically, for write operations to the device 320, the device channel 404 reads the data from the host memory 308 prior to device 320 signaling its readiness to receive the data. The scatter/gather engine 520 is able to activate operations of the data DMA engine 516 early because some scatter/gather data is included in the IOCB. Accordingly, the initiation of data transfer operations does not need to wait for scatter/gather data to be downloaded from memory 308 by the controller 316, and in particular the scatter/gather engine 520.

After the data DMA engine 516 has been started, data transfers between the host system 314 and the device 320 may begin (step 732). If the device 320 is not ready to perform the required data transfers when the data DMA engine 516 is ready, the data DMA engine 516 will wait until such time as the device 320 can begin transfer operations. During the time that the data DMA manager is waiting, the scatter/gather manager 520 can pre-fetch scatter/gather elements and the instruction engine or manager 524 can fetch the next instruction, not leaving the device channel idle. At step 736, a determination is made as to whether the commanded data transfer has been completed. If data remains to be transferred, the system returns to step 732. If the commanded data transfer have been completed, the adapter 316 increments the consumer register 512 (step 740) and the interrupt interface 528 writes the done store and the interrupt manager 402 (step 744).

In addition to commencing the transfer of data between the host system 314 and the device 320 (step 732), the controller 316, following initialization of the data DMA engine 516 determines whether the last scatter/gather element has been reached (step 748). If the last scatter/gather element has not been reached, the scatter/gather engine 520 downloads additional scatter/gather elements (step 752). For example, the next four, or as many scatter/gather elements as are available if there are less than four then available, may be downloaded. After downloading additional scatter/gather elements, a determination is again made as to whether the last scatter/gather element associated with the commanded data transfer operation has been reached (step 748). If at step 748 it is determined that the last scatter/gather element has been reached, the scatter/gather engine 520 is idle (step 728).

From the description of the operation of an embodiment of the present invention given in connection with FIG. 7, it can be appreciated that the present invention does not generate interrupts that must be serviced by the host processor 304 or processor 408, if provided, in connection with routine data transfer operations. In addition, it can be appreciated that the host processor 304, or 408, if provided, is not required to write extensive commands or data to the adapter 316. Instead, the processor 304 or 408 need only increment the producer register 508 when a data transfer operation is required. Furthermore, it can be appreciated that latencies in data transfer operations are reduced or eliminated by the adapter 316 of the present invention, by allowing the data DMA engine 516 to initialize and commence operations without first requiring receipt of a ready signal from the device 320.

Figure 8:
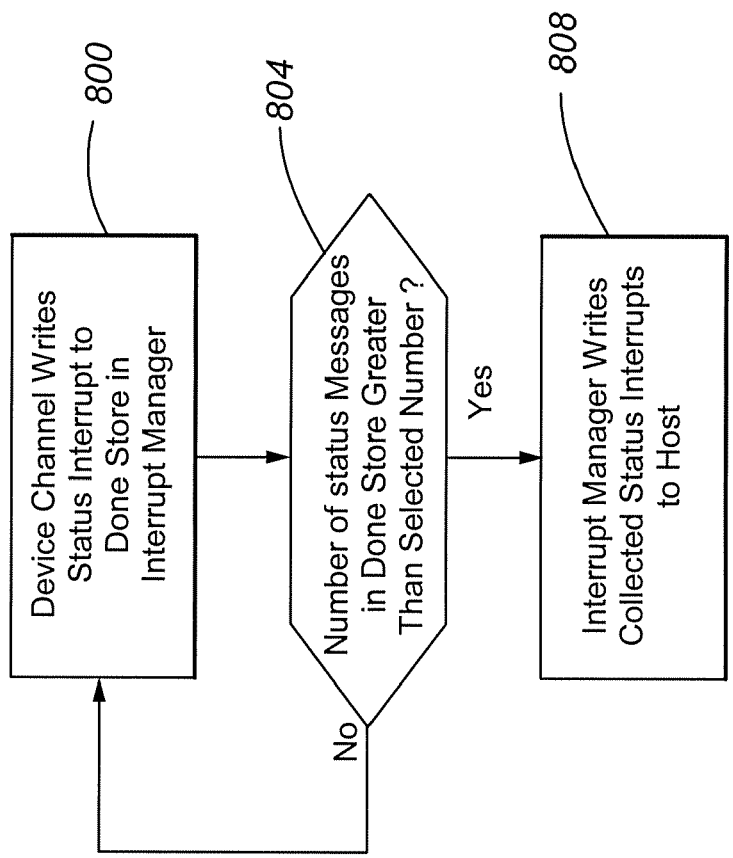
FIG. 8 is a flow chart illustrating the operation of an interrupt manager in accordance with an embodiment of the present invention.

With reference now to FIG. 8, the operation of an interrupt manager engine 402 in accordance with an embodiment of the present invention is illustrated. Initially, at step 800, a device channel 404 writes a status interrupt to the done store 612 in the interrupt manager engine 402. At step 804, a determination is made as to whether the number of status messages stored in the done store 612 is greater than a selected number held in status size register 624. If the number of stored messages is less than the selected number, the interrupt manager engine 402 waits for a next status to be written to it by a device channel at step 800. If the number of stored messages is greater than the selected number, the interrupt manager engine 402 writes the collected status messages to the host system 314 as part of a single interrupt (step 808).

Accordingly, it can be appreciated by one of skill in the art that an adapter 316 incorporating an interrupt manager engine 402 in accordance with an embodiment of the present invention reduces the number of interrupts that the host system 314 must service as compared to a conventional adapter. In particular, instead of interrupting the host processor 304, or processor 408, if provided, every time an interrupt is generated at a device channel 404, the host processor 304, or processor 408, if provided is interrupted only after a selected number of status interrupts have been collected by the interrupt manager engine 402.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for passing command information from a host to a device adapter, comprising:
   a. providing a command block from said host, wherein said command block comprises at least initial scatter/gather data and a command to transfer data;
   b. loading said command block into memory local to said host;
   c. incrementing a producer register;
   d. fetching said command block from said memory and to said device adapter;
   e. initiating operation of a direct memory access engine, without waiting for confirmation from a device that said device is ready to perform a data transfer operation;
   f. performing said command to transfer data contained in said command block; and
   g. incrementing a consumer register.

2. The method of claim 1, wherein said initial scatter/gather data comprises a start address and a data length.

3. The method of claim 1, wherein said command is performed without generating an interrupt requiring servicing by said host.

4. The method of claim 1, wherein said step of fetching said command block comprises accessing said memory local to said host from said device adapter.

5. The method of claim 1, wherein said producer register and said consumer register are established as part of said device adapter.

6. The method of claim 1, further comprising interrupting said host after said step of performing said command contained in said command block.

7. The method of claim 1, further comprising issuing a single interrupt from said controller and to said host, wherein more than one interrupt is transferred in accordance with a command included in said command block.

8. The method of claim 1, wherein said device adapter is operatively connected to a storage device.

9. The method of claim 1, wherein said command comprises at least one of a command to write data to said storage device and a command to read data from said storage device.

10. The method of claim 1, further comprising generating a host interrupt in said device adapter, wherein said host interrupt is related to a plurality of device interrupts.

11. The method of claim 1, wherein said control block comprises a scatter/gather list.

12. The method of claim 1, further comprising writing an address of a first command block in memory.

13. The method of claim 12, wherein said address of a first command block is written to a control block address register.

14. The method of claim 1, wherein said command block comprises an address for scatter/gather data.

15. The method of claim 14, further comprising loading said scatter/gather data into a scatter/gather engine.

16. The method of claim 15, further comprising arming a data DMA engine in response to a non-zero address for scatter/gather data.

17. The method of claim 15, wherein said command contained in said command block comprises a read operation, wherein a data DMA engine receives data from said scatter/gather engine, and wherein said data DMA engine retrieves data identified by said scatter/gather data received from said scatter/gather engine.

18. The method of claim 1, wherein said device comprises at least one of an ATA and a SATA device.

* * * * *